Patented Jan. 1, 1924.

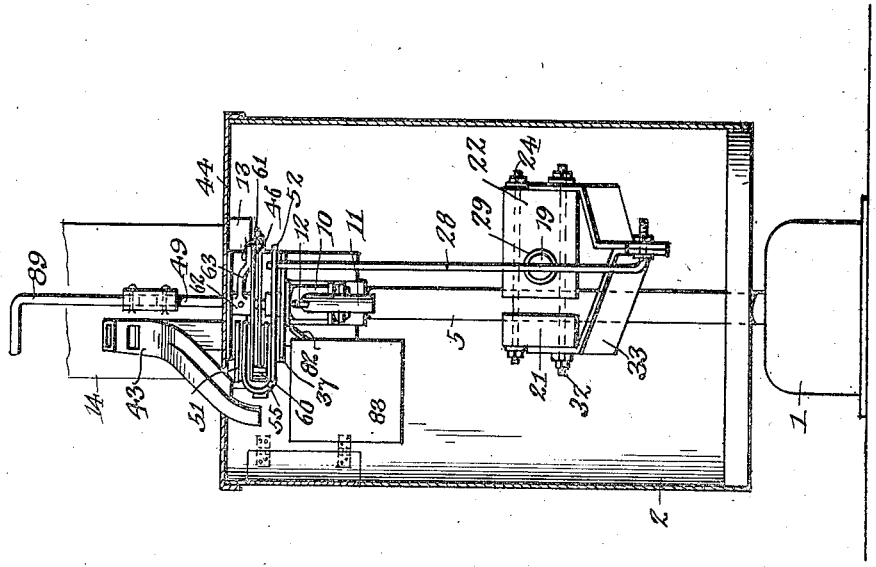

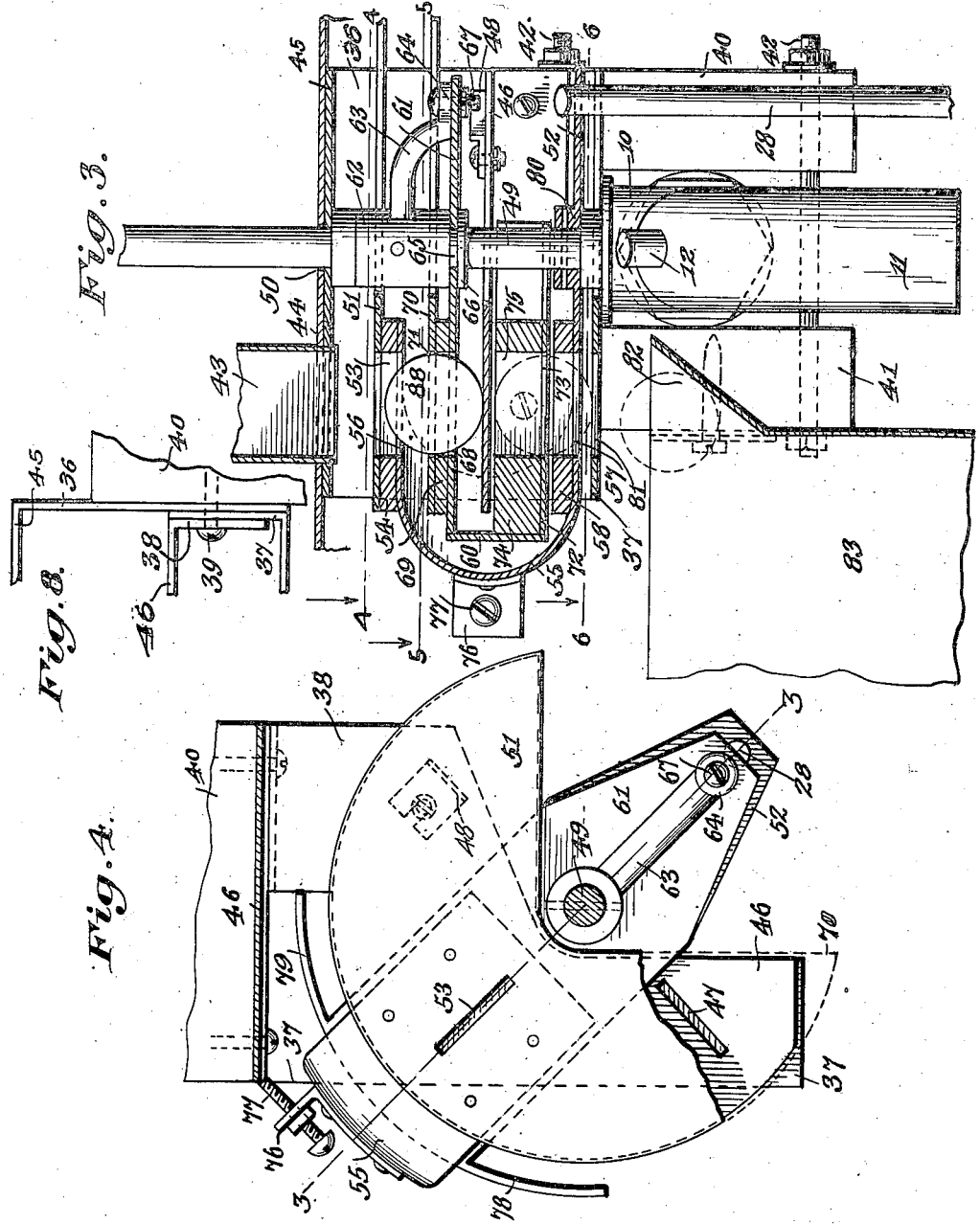

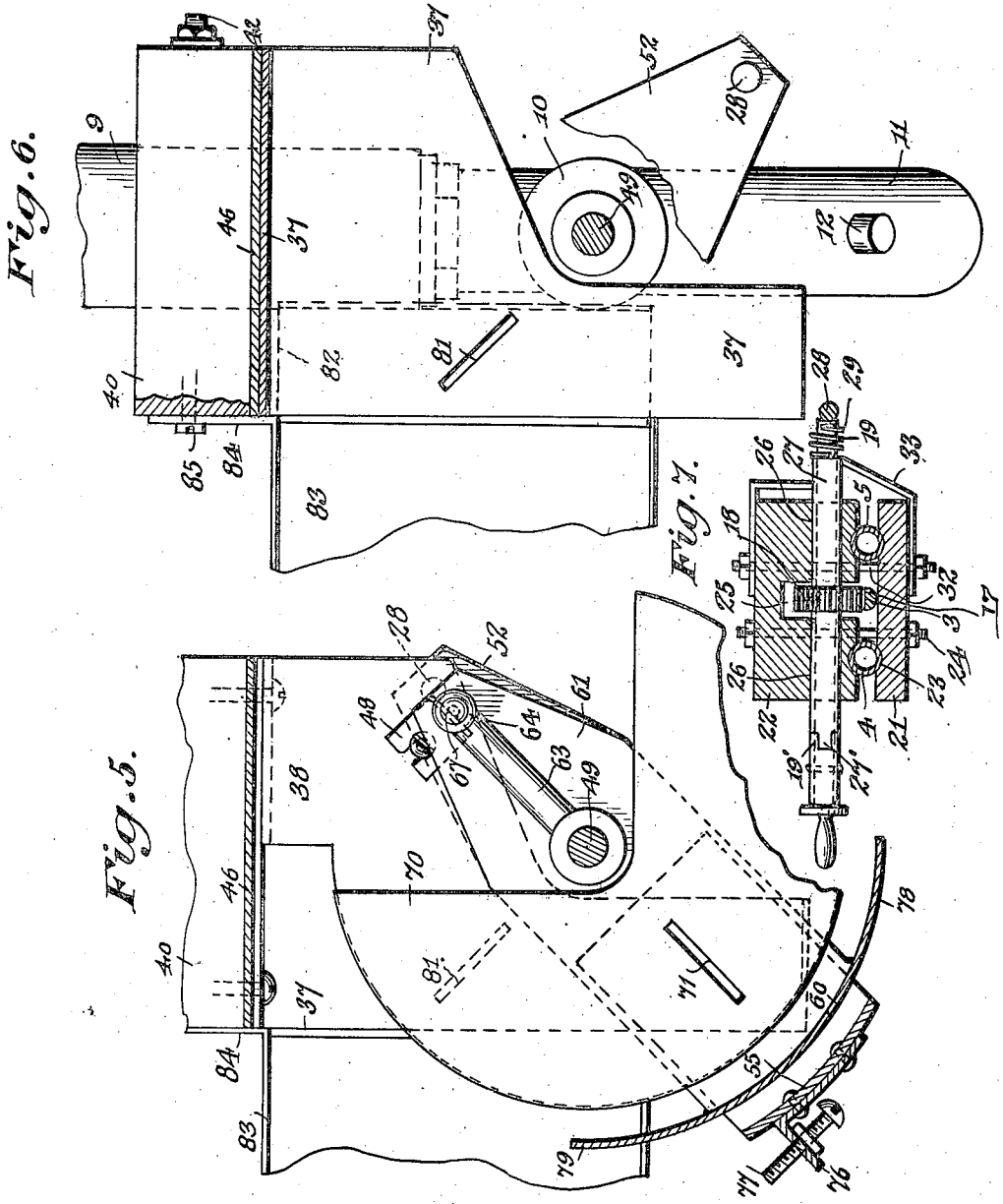

1,479,649

UNITED STATES PATENT OFFICE.

MARCUS C. CHISM, WILLIAM T. FLETCHER, CARROLL E. LORD, AND VICTOR H. FUTCH, OF NASHVILLE, GEORGIA; SAID FLETCHER ASSIGNOR TO SAID CHISM.

GASOLINE DISPENSER.

Application filed December 7, 1922. Serial No. 605,403.

*To all whom it may concern:*

Be it known that we, MARCUS C. CHISM, WILLIAM THOMAS FLETCHER, CARROLL E. LORD, and VICTOR H. FUTCH, citizens of the United States, residing at Nashville, in the county of Berrien and State of Georgia, have invented certain new and useful Improvements in Gasoline Dispensers, of which the following is a specification.
This invention relates to a dispensing apparatus, more particularly to a coin controlled apparatus for dispensing liquids, such as oil, gasoline and the like, but it is to be understood that the apparatus can be employed for any purposes, wherein it is found applicable, and the invention has for its object to provide, in a manner as hereinafter set forth, a coin-controlled apparatus for measuring and dispensing liquids and including means whereby it will be adjusted to deliver, on the insertion of a coin, a measured quantity of liquid, such as gasoline or oil, at the same time, indicating the cost of the same.
A further object of the invention is to provide in a manner as hereinafter set forth, a coin-controlled normally inoperable liquid dispensing apparatus in which the introduction of a coin will permit operation thereof and the delivery of an amount of the liquid equal in value to the coin.

A further object of the invention, is to provide an apparatus for the purpose referred to, in a manner as hereinafter set forth, with means actuated from a coin-controlled element to throw out the operative connection for the pumping mechanism of the apparatus, so as to discontinue feed of the liquid, after a predetermined amount thereof, has been fed for sale or delivery, and to further prevent the operation of the pumping mechanism of the apparatus surreptitiously.

Further objects of the invention are to provide an apparatus for the purpose set forth, which is comparatively simple in its construction and arrangement, strong, durable, efficient and convenient in its use, readily assembled, quickly operated, and comparatively inexpensive.

With the foregoing and other objects in view, the invention consists of a novel construction, combination and arrangement of parts, as hereinafter more specifically described, and illustrated in the accompanying drawings, wherein is shown an embodiment of the invention, but it is to be understood that changes, variations and modifications can be resorted to, which come within the scope of the claims hereunto appended.

In the drawings, wherein like reference characters denote corresponding parts throughout the several views:—

Figure 1 is a sectional elevation of a dispensing apparatus in accordance with this invention, Fig. 2 is a similar view taken at right angles to Fig. 1, Fig. 3 is a section on the line 3—3 of Fig. 4,

Fig. 4 is a section on the line 4—4 of Fig. 3,

Fig. 5 is a section on the line 5—5 of Fig. 3,

Fig. 6 is a section on the line 6—6 of Fig. 3,

Fig. 7 is a section on the line 7—7 of Fig. 1,

Fig. 8 is a fragmentary view illustrating the supporting bracket.

Referring to the drawings in detail 1 denotes the container in which the liquid, such as gasoline or oil, is stored, and mounted thereon is a housing 2. Extending upwardly from the container 1 and through the bottom 3, of the housing 2, is a feed tube 4, and a combined filling and overflow pipe 5. Mounted on the pipe 5 is a fourway coupling 6, having one of its branches extended, as at 7, and connected to the upper end of the feed tube 4. The coupling 6, has one of its branches or legs, as at 8, secured to the upper end of the pipe 5. The branch or leg 9 of the coupling 6, is extended to provide a delivery pipe, and which communicates with a valve mechanism 10, from which projects a discharge nozzle 11, the latter having a protuberance 12, for the purpose of suspending a receptacle therefrom.

The upper vertical branch of the coupling 6, is enlarged and provides a support for the base 13 of a combined measuring and price indicator device, as indicated at 14.

The housing 2 encloses the tube 4, pipe 5, coupling 6, valve mechanism 10, and the nozzle 11 projects outwardly from the housing 2.

The top of the housing 2, is formed with an enlarged opening 15, through which extends the body portion of the combined measuring and indicator device, and which consists of a hollow transparent body closed at its top and also closed at its bottom through the medium of the base 13. The base 13 is positioned within the housing 2 and abuts against the lower face of the top-wall thereof, and is of greater diameter than the diameter of the opening 15. The device 14 is provided with suitable indicia, to indicate the cost per gallon of the fluid, or per fraction of a gallon, as indicated at 16. The upper vertical branch of the coupling 6, opens through the bottom or base 13, of the device 14 into the interior of the latter, so that said device 14 will receive a body of the fluid, for a purpose to be presently referred to.

The pumping element 3, which cooperates with the container 1, extends into the housing 2, and is formed on one side, with a series of rack teeth 17, which mesh with a pinion 18 for imparting a reciprocatory movement to the pumping element. A rotatable and lengthwise shiftable shaft 19 is mounted within and projects outwardly from the housing 2, at one side thereof, and is provided with a crank or handle 20. Positioned against the tube 4 and the pipe 5, are a pair of opposed supporting members 21, 22, and which have the inner faces thereof grooved as at 23, to provide seats for the tube 4 and pipe 5. Against these latter the members 21, 22, are clamped by the holdfast devices 24. The member 22 is slotted as at 25 to provide a clearance for the wheel 18, and said member 22 is furthermore provided with a pair of a longitudinally extending opposed bores 26 in which is mounted a rotatable bearing sleeve 27, which carries the pinion 18. The shaft 19 is detachably connected to the sleeve 27, so that when the shaft 19 is rotated, the sleeve 27, will be carried therewith and cause the operation of the pumping element, and the shaft 19 is lengthwise shiftable so as to move out of engagement with the sleeve 27 to prevent the operation of the latter and of the pumping element. The shaft 19 is shifted lengthwise for the purpose of moving it out of coupling engagement with the sleeve 27, by a pivoted rod 28, which abuts against the inner end of the shaft 19, and when the rod 28 is shifted toward the shaft, it will move the latter outwardly, shifting the coupling element 19′ from engagement with the coupling end 27′ of the sleeve 27, and the outwardly shifting movement of the shaft 19, is had against the action of a coiled spring 29, which is mounted on the inner end of the shaft 19, and interposed between the inner end of the sleeve 27 and the rod 28. One end of the spring 29 is fixed to the inner end of the shaft 19. The outer or enlarged portion of the shaft 27 is mounted in a bushing 31, which is formed integral with the housing 2.

The holdfast devices 24, which clamp the members 21 and 22, to the tube 4 and pipe 5, include a series of bolts, and one of said bolts, which is indicated at 32, is of greater length than the other of the bolts, and the ends of the bolt 32 project from the members 21 and 22.

Mounted on the projecting ends of the bolt 32 is a pair of angle shaped supporting elements 33, each of which is slotted as at 34, and has the lower end of the rod 28, pivotally connected therewith, as at 35. One of the members 33, is of greater length than the other member, so that the rod 28 will be positioned in alignment with the center of the shaft 19.

Secured to the top of the housing 2 and depending therefrom, is an angle shaped bracket 36, and positioned against the lower portion of the vertical leg of the bracket 36, is an angle shaped bracket 37, the horizontal leg thereof being of greater length than the vertical leg. Positioned against the vertical leg of the bracket 37, is an angle shaped bracket 38. The brackets 36, 37 and 38, are secured together by the holdfast devices 39, the latter engaging in a supporting member 40. Opposing the supporting member 40, is a supporting member 41, and the said members 40 and 41 are clamped to the delivery pipe 9 by the holdfast devices 42. Extending down through the top of the housing 2, is a coin tube 43, which projects through an opening 44 in the horizontal leg 45 of the bracket 36, and depends below the said leg 45. The coin tube 43 is stationary. The horizontal leg 46 of the bracket 38 extends over the horizontal leg of the bracket 37 and is provided with a coin slot 47, and also on its upper face with a slot 48.

The valve mechanism 10 includes a vertically disposed valve stem 49, which projects up through the horizontal leg 45 of the bracket 36 and through the top of the housing 2, as indicated at 50, and said stem has coupled therewith a handle member 89, which provides for the convenient actuation of the stem 49, for the purpose of opening the valve mechanism, so that a measured quantity of the liquid can be delivered. The mechanism for actuating the valve stem 49 is controlled by a coin, and said mechanism not only releases the valve stem so it can be shifted to open, but also to close the valve mechanism. The said mechanism, which associates with the valve stem for the purpose of permitting the valve stem being shifted to open and closed position, also includes means for shifting the rod 28, so that the shaft 19 will be shifted lengthwise to arrest operation of the pumping element. That mechanism which associates with the valve stem 49 forms a valve stem releasing and locking mechanism and it consists of an upper coin inlet plate 51, and a lower coin discharge plate 52. The plate 51 is formed with a coin slot 53 which registers with the inner end of the tube 43, and the plate 51 is mounted on a frame 54, which is secured to the upper end of a carrier 55, the latter having a slot 56, which registers with the slot 53. The lower portion of the carrier 55 is extended to provide the plate 52, and is formed with a coin slot 57 which registers with a rectangular frame 58, secured to the upper face of the plate 52. Arranged within the carrier 55 is a valve stem actuating member in the form of a yoke-shape element 60 and with one of the legs thereof indicated at 61 and which is of greater length than the other leg of the element 60. The leg 61 has fixedly secured therewith, as at 64, an upstanding curved arm 63 formed integral with a vertically disposed collar 62. The valve stem 49 extends through the collar 62 and said stem 49 and collar 62 are so set up and constructed relatively to each other whereby the stem 49 cannot be shifted to open the valve mechanism 10 until the valve actuating member is coupled by a coin to the carrier 55 and to provide for such operation, the valve stem may be set up of two sections, one of which is fixed to the collar 62 and the other of which loosely extends into the collar and with this latter section coupled with the collar by an inserted coin when the latter is in position to connect the carrier 55 to the valve actuating member, in a manner as shown in Figure 3. That section of the valve stem upon which the collar 62 is loosely mounted, is connected with the carrier, as shown in Figure 3. The leg 61 is apertured as at 65 for the passage of the valve stem, and a bearing collar 66 is arranged on the stem 49 below the leg 61. The securing means 64, for the arm 63 of the leg 61, depends below the latter as at 67, and associates with the slot 48. The leg 61 is formed with a slot 68, which registers with an opening in a rectangular frame 69, mounted on the leg 61, and said frame 69, carries a plate 70 formed with a slot 71, which registers with the slot 68. The leg 61 is arranged over the horizontal leg 46 of the bracket 38. The lower leg of the element 60, which is indicated at 72, is arranged below the horizontal leg 46 of the bracket 38, and is provided with a coin slot 73, and is also provided on its upper face with a rectangular frame 74, formed with a slot 75, which registers with the slot 73. The slot 73 is adapted to register with the slot 57 for the purpose of discharging the coin.

The carrier 55 is provided with a bracket 76, carrying a stop screw 77, which abuts against the vertical leg of the bracket 36 for limiting the movement of the carrier in one direction. The actuating element 60, is formed with a pair of oppositely disposed arms 78, 79, for the purpose of limiting the movement of said actuating element 60 in either direction. The plate 52 is mounted on the valve stem 49, as indicated at 80. The horizontal leg of the bracket 37, is formed with a coin slot 81, which is arranged over a chute 82, which leads to a coin receptacle 83. The receptacle 83 is provided with a lateral flange 84, which is secured to the supporting member 41, as at 85, whereby the receptacle 83 will be suspended under the slot 81 so that the coins will readily pass therein.

Extending upwardly into the device 14, is an overflow pipe 86, which merges at its lower end into the pipe 5. The device 14 has an air vent 87.

When using the apparatus, the shaft 19 is operated until the device 14 is filled with fluid to the top of the overflow pipe 86. To remove the fluid from the device 14, a coin is inserted in the chute 43 and which passes down into the carrier 55 and the actuating element 60, as shown in Fig. 3. With the coin 88 in the position shown in Fig. 3, the carrier 55 and the valve actuating member are coupled together and which provide for the operation of the valve stem 49 to open or close the valve mechanism 10, when said stem is shifted. With the coin in the position shown in Fig. 3, it rests on the horizontal leg of the bracket 38. When the carrier 55 and the element 60 are coupled together, as shown in Fig. 3, the valve stem 49 can be shifted in the opposite direction, to close the valve mechanism, such movement on the part of the valve stem 49, will shift the carrier 55 and the element 60 therewith, until the movement of the carrier and the element is arrested by the stop 77 and 79. When the carrier 55 and element 60 have been shifted to the position just stated, the slot 57 registers with the slot 81, and the coin will drop through the slot and into the receptacle, under such conditions, uncoupling the element 60 from the carrier 55, thereby preventing the shifting of the valve stem to open and close the valve mechanism.

When the carrier 55 is shifted from the valve stem, during the opening of the valve mechanism, the plate 52 will rock the rod 28, whereby the rod will force the shaft 19 outwardly, causing the separation of the shaft 19 from the sleeve 27, under such conditions, disconnecting the operative connections for the pumping element and under such conditions, preventing the operation thereof.

The carrier 55 and the coupling element 60 are so set up relatively to each other, and with respect to the valve rod 49, that the latter cannot be shifted in either direction unless the carrier 55 and the actuating element 60 are coupled together by a coin.

The overflow pipe 86 is so set up, that it can be raised or lowered, when occasion so requires, to provide for the changes in prices of the fluid, and such provision is had through the medium of a jack nut 90, positioned below the base of the device 14.

What we claim is:—

1. A dispensing apparatus for fluids comprising a measuring element, a pumping element for supplying fluids to said measuring element, a normally closed outlet valve mechanism associated therewith, a normally locked actuating element for opening and closing said valve mechanism, a carrier overlapping said actuating element and adapted to be coupled therewith to release the same, to permit of the operation thereof, to open said valve mechanism to cause a discharge of fluid from the measuring element, and means actuated by said carrier when coupled to said actuating element to discontinue the operation of said pumping element.

2. A fluid dispensing apparatus comprising a measuring element, a pump mechanism for supplying fluids to said element, a normally closed discharged valve mechanism associated with said element, a coin controlled actuating element for opening and closing said valve mechanism, a coin controlled carrier enclosing said element and adapted to be coupled therewith by a coin to release said element to permit of the operation thereof, thereby opening and closing said valve mechanism, means for directing a coin to couple said actuating element and said carrier together, and means to cause discharge of the coin from said carrier and actuating element.

3. In a liquid dispensing apparatus a valve mechanism for controlling discharge of fluids, a normally locked actuating element for operating with the valve stem of said mechanism to open and close the latter, a normally locked carrier overlapping said actuating element and adapted to be coupled therewith to release the same, whereby said element will cooperate with the valve stem to open and close said mechanism, said element and said carrier being coin-controlled, means for directing the coin to couple said element and carrier together, and means to cause the discharge of the coin to uncouple said carrier and element.

4. A fluid dispensing apparatus comprising a fluid measuring element, a pumping means for supplying fluid thereto, a valve mechanism cooperating with said element for controlling the discharge of the fluid therefrom, a shiftable coin-controlled carrier cooperating with said means for discontinuing the operation thereof when said carrier is shifted, and a coin-controlled actuating element cooperating with the valve stem of said mechanism and with said carrier and adapted when the carrier is shifted to permit of the operation of said valve stem, thereby opening and closing said valve mechanism.

5. A fluid dispensing apparatus comprising a fluid measuring element, a pumping means for supplying fluid thereto, a valve mechanism cooperating with said element for controlling the discharge of the fluid therefrom, a shiftable coin-controlled carrier cooperating with said means for discontinuing the operation thereof when said carrier is shifted, a coin-controlled actuating element cooperating with the valve stem of said mechanism and with said carrier and adapted when the carrier is shifted to permit of the operation of said valve stem, thereby opening and closing said valve mechanism, means for directing a coin to couple said carrier to said actuating element, and means causing the discharge of the coin from said carrier and element, thereby locking said valve stem from movement and releasing said means for operation.

6. A fluid dispensing apparatus comprising a fluid measuring element, a pumping means for supplying fluid thereto, a valve mechanism cooperating with said element for controlling the discharge of the fluid therefrom, a shiftable coin-controlled carrier cooperating with said means for discontinuing the operation thereof when said carrier is shifted, a coin-controlled actuating element cooperating with the valve stem of said mechanism and with said carrier and adapted when the carrier is shifted to permit of the operation of said valve stem, thereby opening and closing said valve mechanism, means for directing a coin to couple said carrier to said actuating element, means causing the discharge of the coin from said carrier and element, thereby locking said valve stem from movement and releasing said means for operation, and a coin receiving receptacle arranged below said carrier.

7. In a fluid dispensing apparatus, the combination with a pumping mechanism including driving elements therefor, and a coin-controlled mechanism, of an oscillatory element and shiftable by said coin-controlled mechanism for discontinuing the operation of the pumping mechanism by separating the driving elements thereof.

8. A fluid dispensing apparatus comprising a measuring element, means for supplying fluid thereto, a valve mechanism controlling delivery of a measured quantity of fluid from said element, a shiftable coin-controlled carrier provided with a pivoted rod for discontinuing the operation of said means during delivery of fluids from said element, and a shiftable actuating member connected to said mechanism and overlapped and adapted to be coupled with the carrier by a coin to permit of the opening and closing movements of said mechanism to deliver a measured quantity of fluid during the shifting of said carrier and member.

9. A fluid dispensing apparatus comprising a measuring element, means for supplying fluid thereto, a valve mechanism controlling delivery of a measured quantity of fluid from said element, a shiftable coin-controlled carrier provided with a pivoted rod for discontinuing the operation of said means during delivery of fluids from said element, a shiftable actuating member connected to said mechanism and overlapped and adapted to be coupled with the carrier by a coin to permit of the opening and closing movements of said mechanism to deliver a measured quantity of fluid during the shifting of said carrier and member, and means for holding the coin in said carrier and member during the shifting of the latter to and from inoperative position.

10. A fluid dispensing apparatus comprising a measuring element, means for supplying fluid thereto, a valve mechanism controlling delivery of a measured quantity of fluid from said element, a shiftable coin-controlled carrier provided with a pivoted rod for discontinuing the operation of said means during delivery of fluids from said element, a shiftable actuating member connected to said mechanism and overlapped and adapted to be coupled with the carrier by a coin to permit of the opening and closing movements of said mechanism to deliver a measured quantity of fluid during the shifting of the said carrier and member, means for directing a coin to said carrier and member, and means for directing the coin from the upper portion of said carrier and member to the lower portion thereof.

11. A fluid dispensing apparatus comprising a measuring element, means for supplying fluid thereto, a valve mechanism controlling delivery of a measured quantity of fluid from said element, a shiftable coin-controlled carrier provided with a pivoted rod for discontinuing the operation of said means during delivery of fluids from said elements, a shiftable actuating member connected to said mechanism and overlapped and adapted to be coupled with the carrier by a coin to permit of the opening and closing movements of said mechanism to deliver a measured quantity of fluid during the shifting of the said carrier and member, means for directing a coin to said carrier and member, means for directing the coin from the upper portion of said carrier and member to the lower portion thereof, and means for directing discharge of the coin from the lower portion of said member and carrier to uncouple them.

12. A fluid dispensing apparatus comprising a measuring element, means for supplying fluid thereto, a valve mechanism controlling delivery of a measured quantity of fluid from said element, a shiftable coin-controlled carrier provided with a pivoted rod for discontinuing the operation of said means during delivery of fluids from said element, a shiftable actuating member connected to said mechanism and overlapped and adapted to be coupled with the carrier by a coin to permit of the opening and closing movements of said mechanism to deliver a measured quantity of fluid during the shifting of said carrier and member, means for holding the coin in said carrier and member during the shifting of the latter to and from inoperative position, and means for directing discharge of the coin from said member and carrier to uncouple them.

13. A fluid dispensing apparatus comprising a measuring element, means for supplying fluid thereto, a valve mechanism controlling delivery of a measured quantity of fluid from said element, a shiftable coin-controlled carrier provided with a pivoted rod for discontinuing the operation of said means during delivery of fluids from said element, a shiftable actuating member connected to said mechanism and overlapped and adapted to be coupled with the carrier by a coin to permit of the opening and closing movements of said mechanism to deliver a measured quantity of fluid during the shifting of said carrier and member, stop devices for arresting the movement of said carrier in either direction, and stop devices for arresting the movement of said member in either direction.

14. A fluid dispensing apparatus comprising a measuring element, means for supplying fluid thereto, a valve mechanism controlling delivery of a measured quantity of fluid from said element, a shiftable coin-controlled carrier provided with a pivoted rod for discontinuing the operation of said means during delivery of fluids from said element, a shiftable actuating member connected to said mechanism and overlapped and adapted to be coupled with the carrier by a coin to permit of the opening and closing movements of said mechanism to deliver a measured quantity of fluid during the shifting of said carrier and member, means for holding the coin in said carrier and member during the shifting of the latter to and from inoperative position, stop devices for limiting the movement of said carrier in either direction, and stop devices for limiting the movement of said member in either direction.

15. A fluid dispensing apparatus comprising a measuring element, means for supplying fluid thereto, a valve mechanism controlling delivery of a measured quantity of fluid from said element, a shiftable coin-controlled carrier provided with a pivoted rod for discontinuing the operation of said means during delivery of fluids from said element, a shiftable actuating member connected to said mechanism and overlapped and adapted to be coupled with the carrier by a coin to permit of the opening and closing movements of said mechanism to deliver a measured quantity of fluid during the shifting of the said carrier and member, means for directing a coin to said carrier and member, means for directing the coin from the upper portion of said carrier and member to the lower portion thereof, stop devices for limiting the movement of said carrier in either direction, and stop devices for limiting the movement of said member in either direction.

16. A fluid dispensing apparatus comprising a measuring element, means for supplying fluid thereto, a valve mechanism controlling delivery of a measured quantity of fluid from said element, a shiftable coin-controlled carrier provided with a pivoted rod for discontinuing the operation of said means during delivery of fluids from said element, a shiftable actuating member connected to said mechanism and overlapped and adapted to be coupled with the carrier by a coin to permit of the opening and closing movements of said mechanism to deliver a measured quantity of fluid during the shifting of said carrier and member, and means for opening and closing said mechanism when the carrier and member are coupled together.

17. A fluid dispensing apparatus comprising a measuring element, means for supplying fluid thereto, a valve mechanism controlling delivery of a measured quantity of fluid from said element, a shiftable coin-controlled carrier provided with a pivoted rod for discontinuing the operation of said means during delivery of fluids from said element, a shiftable actuating member connected to said mechanism and overlapped and adapted to be coupled with the carrier by a coin to permit of the opening and closing movements of said mechanism to deliver a measured quantity of fluid during the shifting of said carrier and member, means for holding the coin in said carrier and member during the shifting of the latter to and from inoperative position, and means for opening and closing said mechanism when the carrier and member are coupled together.

18. A fluid dispensing apparatus comprising a measuring element, means for supplying fluid thereto, a valve mechanism controlling delivery of a measured quantity of fluid from said element, a shiftable coin-controlled carrier provided with a pivoted rod for discontinuing the operation of said means during delivery of fluids from said element, a shiftable actuating member connected to said mechanism and overlapped and adapted to be coupled with the carrier by a coin to permit of the opening and closing movements of said mechanism to deliver a measured quantity of fluid during the shifting of the said carrier and member, means for directing a coin to said carrier and member, means for directing the coin from the upper portion of said carrier and member to the lower portion thereof, and means for opening and closing said mechanism when the carrier and member are coupled together.

19. A fluid dispensing apparatus comprising a measuring element, means for supplying fluid thereto, a valve mechanism controlling delivery of a measured quantity of fluid from said element, a shiftable coin-controlled carrier provided with a pivoted rod for discontinuing the operation of said means during delivery of fluids from said element, a shiftable actuating member connected to said mechanism and overlapped and adapted to be coupled with the carrier by a coin to permit of the opening and closing movements of said mechanism to deliver a measured quantity of fluid during the shifting of the said carrier and member, means for directing a coin to said carrier and member, means for directing the coin from the upper portion of said carrier and member to the lower portion thereof, means for directing discharge of the coin from the lower portion of said member and carrier to uncouple them, and means for opening and closing said mechanism when the carrier and member are coupled together.

In testimony whereof, we affix our signatures hereto.

MARCUS C. CHISM.
WILLIAM T. FLETCHER.
CARROLL E. LORD.
VICTOR H. FUTCH.